Patented Feb. 17, 1942

2,273,262

UNITED STATES PATENT OFFICE 2,273,262

STABILIZED VINYLIDENE CHLORIDE COMPOSITIONS

Alden W. Hanson and William C. Goggin, Midland, Mich., assignors to The Dow Chemical Company, Midland, Mich., a corporation of Michigan No Drawing. Application September 19, 1940, Serial No. 357,420

9 Claims. (Cl. 260—80)

This invention relates to compositions of matter comprising polymeric vinylidene chloride products and modifying agents therefor, which are capable of improving the stability of the polymers to heat and light.

The polymer of vinylidene chloride, many of its copolymers with other polymerizable compounds, various plasticized compositions thereof, and certain ways in which they may be made, have been described in U. S. Patents Nos. 2,160,-903, 2,160,904, and 2,160,931–948. Most of these polymeric products, which are referred to as "polymeric vinylidene chloride products," can be molded, particularly at elevated temperatures and under moderately high pressures, to form useful, shaped articles. They commonly suffer from the disadvantage of undergoing decomposition due to the effects of prolonged exposure to heat and/or light.

The plastic properties of the above mentioned polymer products may be modified considerably by adding certain plasticizing agents either to the polymer or to the monomer or mixture of monomers from which the polymer is prepared. Most of the plasticizers are apparently incapable of preventing or of substantially reducing the tendency of these polymers to decompose or to darken on prolonged exposure to heat and/or light. Some addition agents have been found to stabilize the polymer products somewhat against the effects of heat. Others stabilize the polymer products somewhat against the injurious effects of light. In a few instances the stabilizing agent has, as well, some slight plasticizing properties. So far as is now known, there has not been made available previously any polymeric vinylidene chloride composition comprising a stabilizing agent which is capable at the same time of providing stability against the injurious effects of light and heat while serving as an excellent and non-toxic plasticizer.

It is, accordingly, an object of the present invention to provide a composition consisting predominantly of a polymeric vinylidene chloride product which is more resistant to thermal decomposition and to the darkening effect of prolonged exposure to light than is the polymeric vinylidene chloride product alone. Another object is to provide a stabilized composition as aforesaid which can be heated without decomposition to temperatures sufficiently above the softening point of the composition so that the polymer may be readily worked while in a plastic state. Another object is to provide such a stabilized composition which resists the discoloring effects of light when exposed thereto for extended periods of time.

It has now been found that the foregoing and related objects may be readily attained by incorporating in the polymer or co-polymer, either during or after polymerization, an ester of aconitic acid. The most effective esters of this class appear to be the alkyl esters and particularly those wherein the alkyl radical contains from 1 to 4 carbon atoms. The higher alkyl esters are also somewhat effective and provide improved compositions as do the aryl and aralkyl esters of aconitic acid. Examples of the preferred compounds for use in the herein claimed compositions are triethyl aconitate, tripropyl aconitate, and tributyl aconitate. Among the other esters which may be employed for the present purpose are the methyl benzyl and phenyl esters of aconitic acid.

The amount of aconitic acid ester to be employed may vary with the type of co-polymer to which it is added and with the conditions against which it is desired to protect the polymeric product. Since other plasticizers may be employed to provide the desired plasticity at lower cost than is possible with the aconitates, these latter are employed primarily for their stabilizing effect and in amounts varying from about 0.1 to about 10 per cent of the weight of polymer to be protected. Larger amounts than those indicated may, of course, be employed, especially when the aconitate is relied on to provide both stability and plasticity. The preferred and most practical amounts of these esters for the protection of the polymers against thermal decomposition are from 0.5 to 5 per cent.

The following example illustrates the advantages of the compositions of the present invention;

A number of compositions were made up consisting of various vinylidene chloride co-polymers and from 0.1 to 10 per cent of certain esters of aconitic acid. Samples to be tested for light stability were made in the form of relatively thin films which were measured for their light transmission values using a standard light source both before and after exposure of the film in a standard Fadeometer for 46 hours. The stability of the compositions to heat was determined by visual observation of the color of the samples which were heated in air for 1 hour at 60° C. and then for 2 to 3 hours at 90° C. All of the aconitic acid esters gave compositions of improved thermal stability as compared with the respective vinylidene chloride polymers or co-polymers alone.

The following table gives an evaluation of three of the aconitic acid esters as stabilizers against the effect of light. In each pair of numerals appearing in the table the first is the per cent of the available visible light transmitted through the sample before exposure in the Fadeometer and the second is the per cent transmitted after the 46 hour exposure. The results given are averages of closely agreeing values for vinylidene chloride polymers containing the indicated amounts of the respective esters.

| Ester concentration, per cent | Triethyl aconitate | Tripropyl aconitate | Tributyl aconitate |
| --- | --- | --- | --- |
| 0.0 (blank) | 89-76 | 88-76 | 89-76 |
| 0.1 | 89-79 | | 89-80 |
| 0.5 | 89-86 | | 89-85 |
| 1.0 | 89-88 | 89-76 | 89-88 |
| 2.0 | 90-88 | | 90-87 |
| 3.0 | 90-88 | | 89-87 |
| 5.0 | 89-87 | 89-82 | 87-86 |
| 10.0 | 89-89 | 86-86 | 88-88 |

Among the polymeric vinylidene chloride products which have been treated advantageously with the aconitic acid esters in accordance with the present invention are the polymer of vinylidene chloride alone and its co-polymers with vinyl chloride, vinyl acetate, styrene, vinyl cyanide, ethyl acrylate, methyl methacrylate, and the like.

Other modes of applying the principle of our invention may be employed instead of the one explained, change being made as regards the materials employed, provided the ingredients stated by any of the following claims or the equivalent of such stated ingredients be employed.

We therefore particularly point out and distinctly claim as our invention:

1. A composition of matter comprising a polymeric vinylidene chloride product and an ester of aconitic acid at least in stabilizing quantities.

2. A composition of matter comprising a polymeric vinylidene chloride product and, as a stabilizing agent therefor, from 0.1 to about 10 per cent, based on the weight of the polymer, of an ester of aconitic acid.

3. A composition of matter comprising a polymeric vinylidene chloride product and an alkyl ester of aconitic acid at least in stabilizing quantities.

4. A composition of matter comprising a polymeric vinylidene chloride product and an alkyl ester of aconitic acid wherein the alkyl group contains from 1 to 4 carbon atoms, at least in stabilizing quantities.

5. A composition of matter comprising a polymeric vinylidene chloride product and, as a stabilizing agent therefor, a trialkyl ester of aconitic acid wherein each alkyl group contains from 1 to 4 carbon atoms.

6. A composition of matter comprising a polymeric vinylidene chloride product and, as a stabilizing agent therefor, triethyl aconitate.

7. A composition of matter comprising a polymeric vinylidene chloride product and, as a stabilizing agent therefor, from 0.1 to about 10 per cent of triethyl aconitate.

8. A composition of matter comprising a polymeric vinylidene chloride product and, as a stabilizing agent therefor, tripropyl aconitate.

9. A composition of matter comprising a polymeric vinylidene chloride product and, as a stabilizing agent therefor, tributyl aconitate.

ALDEN W. HANSON.
WILLIAM C. GOGGIN.